United States Patent
Nishimine et al.

(10) Patent No.: US 6,932,953 B2
(45) Date of Patent: Aug. 23, 2005

(54) PARTICULATE SILICA AND ITS PREPARATION

(75) Inventors: Masanobu Nishimine, Tokyo (JP); Susumu Ueno, Annaka (JP); Yoichi Tanifuji, Tokyo (JP); Tomoyoshi Koike, Annaka (JP); Tomio Iwase, Annaka (JP); Michiaki Sezai, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 269 days.

(21) Appl. No.: 10/000,340

(22) Filed: Dec. 4, 2001

(65) Prior Publication Data

US 2002/0102199 A1 Aug. 1, 2002

(30) Foreign Application Priority Data

Dec. 5, 2000 (JP) ........................................ 2000-369466

(51) Int. Cl.[7] .............................................. C01B 33/18
(52) U.S. Cl. ........................ 423/337; 423/335; 423/336
(58) Field of Search ................................. 423/335, 336, 423/337

(56) References Cited

U.S. PATENT DOCUMENTS

| | | | | |
|---|---|---|---|---|
| 2,823,982 A | * | 2/1958 | Saladin et al. | 423/337 |
| 3,361,525 A | | 1/1968 | De Rycke et al. | |
| 3,954,945 A | * | 5/1976 | Lange et al. | 423/336 |
| 4,108,964 A | | 8/1978 | Kratel et al. | |
| 4,258,023 A | * | 3/1981 | Schmid et al. | 423/336 |
| 4,565,682 A | | 1/1986 | Loskot et al. | |
| 4,801,437 A | * | 1/1989 | Konagaya et al. | 423/210 |
| 5,123,836 A | * | 6/1992 | Yoneda et al. | 431/5 |
| 5,340,560 A | * | 8/1994 | Rohr et al. | 423/337 |
| 5,855,860 A | * | 1/1999 | Nishimine et al. | 423/337 |
| 6,322,765 B1 | | 11/2001 | Muhlhofer et al. | |
| 6,588,230 B1 | * | 7/2003 | Adler et al. | 65/17.3 |

FOREIGN PATENT DOCUMENTS

| | | |
|---|---|---|
| EP | 0 044 903 A2 | 2/1982 |
| EP | 0 706 972 A1 | 4/1996 |
| EP | 0790213 | 8/1997 |
| FR | 1 345 178 | 11/1962 |
| GB | 2049641 | 3/1980 |
| JP | 47-46274 | 11/1972 |
| JP | 56-38526 | 9/1981 |
| JP | 58-54085 | 12/1983 |
| JP | 2889202 | 2/1999 |

* cited by examiner

*Primary Examiner*—Ngoc-Yen Nguyen
(74) *Attorney, Agent, or Firm*—Birch, Stewart, Kolasch & Birch, LLP

(57) ABSTRACT

Particulate silica is prepared by feeding a gas mixture of an organohalosilane gas, a flammable gas capable of generating water vapor when burned, and a free oxygen-containing gas to a reaction chamber through a multiple-tube burner, whereby the organohalosilane is subjected to flame hydrolysis and oxidation reaction. The amount of the flammable gas fed is 0.5–9 mol per mol of the organohalosilane and such that the amount of water vapor resulting from combustion of the flammable gas is 1–6 times the stoichiometric amount, and the gas mixture is fed to the center tube of the burner such that it may have a linear velocity at the outlet of 50–120 m/sec, calculated in the standard state. The resulting silica has a surface area of 100–400 m$^2$/g and a narrow particle size distribution of primary particles and ensures the transparency of silicone rubber filled therewith.

9 Claims, 3 Drawing Sheets

PARTICULATE SILICA AND ITS PREPARATION

This invention relates to a method for preparing particulate silica and the particulate silica thus prepared.

BACKGROUND OF THE INVENTION

Particulate silica produced by the flame hydrolysis process is characterized by fineness, high purity and high dispersibility and finds typical use as (1) a thickening, anti-settling or dispersing agent for liquids, (2) a reinforcing filler for elastomers and polymers, and (3) an anti-caking or flow-improving agent for powder.

In particular, particulate silica is indispensable to silicone resins because it exerts the above-mentioned characteristics to the full extent when combined with silicone resins.

Particulate silica by the flame hydrolysis process is generally produced by mixing tetrachlorosilane with hydrogen and air and burning the mixture as disclosed in JP-B 47-46274. It is convenient for the silicone manufacturer if the process starts with, instead of tetrachlorosilane, organohalosilanes such as methyltrichlorosilane which is a by-product in the synthesis of dimethyldichlorosilane.

The synthesis of particulate silica from organohalosilanes is known from JP-B 56-38526 corresponding to U.S. Pat. No. 4,108,964, JP-B 58-54085 corresponding to GB 2,049,641 and Japanese Patent No. 2889202 corresponding to EP 790213A. As noted in these patents, the process starting with organohalosilanes has the problem that silica is blackened due to residual carbon unless conditions are strictly controlled.

Yet, the organohalosilane itself is flammable and has a propensity that as the flame is lengthened, the flame temperature distribution locally varies, inviting a substantial size variation of silica particles and even formation of giant particles. When such particulate silica is used as a filler in silicone rubber, unexpectedly, the physical properties such as strength of rubber moldings are not adversely affected. However, the transparency of rubber moldings is degraded. For silicone rubber, the outer appearance including transparency is one of important factors for its commodity value.

The above-listed patents describe that particulate silica free of blackening due to residual carbon and having a specific surface area of 100 to 400 m²/g can be synthesized from organohalosilanes, but do not refer to the synthesis of silica having a specific surface area of 100 to 400 m²/g and a narrow particle size distribution of primary particles and ensuring the transparency of silicone moldings filled therewith.

SUMMARY OF THE INVENTION

An object of the invention is to provide a novel and improved method for preparing particulate silica by subjecting a gaseous organohalosilane to flame hydrolysis with a flammable gas capable of generating water vapor when burned and a free oxygen-containing gas, so that particulate silica may be produced having a specific surface area of 100 to 400 m²/g and a narrow particle size distribution of primary particles as demonstrated by a logarithmic standard deviation of primary particle diameter of up to 0.5 and ensuring the transparency of silicone rubber filled therewith. Another object is to provide the particulate silica prepared by the method.

The invention is directed to a method for preparing particulate silica by feeding a mixture of a gaseous organohalosilane such as a methylchlorosilane, typically methyltrichlorosilane which is a by-product in the synthesis of dimethyldichlorosilane from metallic silicon and methyl chloride, with a flammable gas capable of generating water vapor when burned, typically hydrogen and a free oxygen-containing gas, typically air to a reaction chamber through a burner, thereby subjecting the organohalosilane to flame hydrolysis and then oxidation reaction. It has been found that when the amount of the flammable gas fed is such that the amount of water vapor resulting from combustion of the flammable gas is 1 to 6 times the stoichiometric amount in reaction scheme (I) shown below, the burner used is one having a plurality of concentric tubes, and the gas mixture is fed to the center tube of the burner such that it may have a linear velocity at the outlet of the center tube of 50 to 120 m/sec, calculated in the standard state, there is obtained particulate silica having a specific surface area of 100 to 400 m²/g and a narrow particle size distribution as demonstrated by a logarithmic standard deviation of primary particle diameter of up to 0.5 and ensuring the transparency of silicone moldings filled therewith. Better results are obtained when the free oxygen-containing gas contains an amount of oxygen which is 1.0 to 2.0 times the sum of the oxygen equivalent necessary to synthesize $SiO_2$ from $R_{4-n}SiX_n$ (or its hydrolyzate $C_iH_jSiO_{n/2}$) and the oxygen equivalent necessary for combustion of the flammable gas.

Accordingly, the present invention provides a method for preparing particulate silica, comprising the step of feeding a gas mixture of at least one organohalosilane gas of the formula: $R_{4-n}SiX_n$ wherein R is hydrogen, methyl, ethyl or phenyl, X is a halogen atom, n is an integer of 1 to 3, with the proviso that n=3 when R is phenyl, a flammable gas capable of generating water vapor when burned, and a free oxygen-containing gas to a reaction chamber through a burner, whereby the organohalosilane is subjected to flame hydrolysis according to the scheme (I):

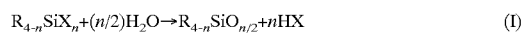

$$R_{4-n}SiX_n + (n/2)H_2O \rightarrow R_{4-n}SiO_{n/2} + nHX \quad (I)$$

wherein R, X and n are as defined above, and then to oxidation reaction according to the scheme (II):

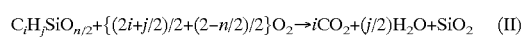

$$C_iH_jSiO_{n/2} + \{(2i+j/2)/2 + (2-n/2)/2\}O_2 \rightarrow iCO_2 + (j/2)H_2O + SiO_2 \quad (II)$$

wherein $C_iH_j$ is a general form of $R_{4-n}$ so that i varies in the range of 0 to 6 and j varies in the range of 1 to 15 as R is hydrogen, methyl, ethyl or phenyl, n is as defined above, with the proviso that n=3 when R is phenyl, thereby forming particulate silica. According to the invention, the amount of the flammable gas fed is ½ to 9 mol per mol of the organohalosilane and such that the amount of water vapor resulting from combustion of the flammable gas is 1 to 6 times the stoichiometric amount in scheme (I). The burner has a plurality of concentric tubes including a center tube, having an outlet open to the reaction chamber. The gas mixture is fed to the center tube of the burner such that it may have a linear velocity at the outlet of the center tube of 50 to 120 m/sec, calculated in the standard state.

The invention also provides particulate silica produced by the above method and having a specific surface area of 100 to 400 m²/g and a logarithmic standard deviation of primary particle diameter of up to 0.5.

DESCRIPTION OF THE PREFERRED EMBODIMENTS

The method for preparing particulate silica according to the invention involves premixing a gaseous organohalosilane with a flammable gas capable of generating water vapor when burned and a free oxygen-containing gas, and feeding the premix through a burner to a reaction chamber wherein the organohalosilane is subjected to flame hydrolysis. It is essential that the feed amount of the flammable gas capable of generating water vapor when burned, the configuration of the burner, and the input rate of the gas premix ejected from the burner meet specific requirements. It is recommended that the amount of oxygen relative to the flammable gas and the configuration of the burner be adjusted to specific ranges. When these requirements are met during the preparation of particulate silica using the organohalosilane as the raw material, the particulate silica thus obtained has a specific surface area of 100 to 400 m²/g and a narrow particle size distribution of primary particles and ensures the transparency of silicone moldings filled therewith.

The organohalosilane used herein is of the formula:

$$R_{4-n}SiX_n$$

wherein R is hydrogen, methyl, ethyl or phenyl, X is a halogen atom such as chlorine, n is an integer of 1 to 3, with the proviso that n=3 when R is phenyl, while no other limits are imposed thereon. The organohalosilane should preferably have a boiling point of 250° C. or lower in order to feed it to the burner in a gasified form. Exemplary organohalosilanes are methyltrichlorosilane, methyldichlorosilane, trimethylchlorosilane and dimethyldichlorosilane. The organohalosilane of great interest to the invention is methyltrichlorosilane which is a by-product in the synthesis of dimethyldichlorosilane from metallic silicon and methyl chloride.

The flammable gas capable of generating water vapor ($H_2O$) when burned is most preferably hydrogen although methane, propane and gaseous methanol may be used as well.

Air is preferred as the free oxygen-containing gas from the economical standpoint.

For the flame hydrolysis of the halosilane, a multi-tube burner, that is, a burner having a plurality of concentric tubes is used.

Figure 1:
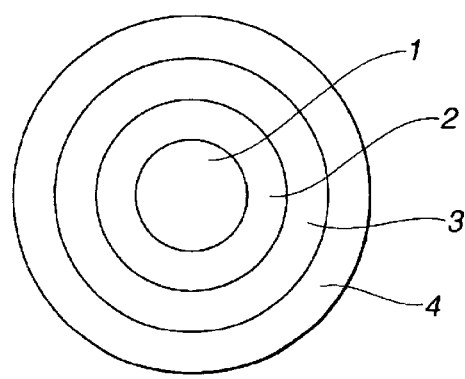
FIG. 1 is a schematic sectional view of an exemplary quadruple-tube burner for use in the practice of the invention.

Referring to FIG. 1, a quadruple-tube burner is illustrated as having a center tube 1, second tube 2, third tube 3, and fourth tube 4 which are arranged concentrically from inside to outside. The center tube 1 receives a mixture of the organohalosilane gas, the flammable gas capable of generating water vapor when burned and the free oxygen-containing gas. The second tube 2 receives the free oxygen-containing gas. The third tube 3 receives the flammable gas. The fourth or outermost tube 4 receives the free oxygen-containing gas. It is understood that a triple-tube burner arrived at by eliminating the fourth tube 4 from the above arrangement and a double-tube burner arrived at by further eliminating the third tube 3 can also be used. The burner and hence, each tube terminates at an outlet which is open to the reaction chamber.

As noted above, the free oxygen-containing gas through the second tube is preferably air; the flammable gas through the third tube is preferably hydrogen; and the free oxygen-containing gas through the fourth tube is preferably air.

According to the invention, a gas mixture of the organohalosilane gas, the flammable gas capable of generating water vapor when burned, and the free oxygen-containing gas is fed to a reaction chamber through the burner, whereby the organohalosilane is subjected to flame hydrolysis according to the scheme (I):

$$R_{4-n}SiX_n+(n/2)H_2O \rightarrow R_{4-n}SiO_{n/2}+nHX \qquad (I)$$

wherein R, X and n are as defined above, and then to oxidation reaction according to the scheme (II):

$$C_iH_jSiO_{n/2}+\{(2i+j/2)/2+(2-n/2)/2\}O_2 \rightarrow iCO_2+(j/2)H_2O+SiO_2 \qquad (II)$$

wherein $C_iH_j$ is a general form of $R_{4-n}$ so that i varies in the range of 0 to 6 and j varies in the range of 1 to 15 depending on R which is hydrogen, methyl, ethyl or phenyl, and n is as defined above, thereby forming particulate silica.

To obtain particulate silica which ensures that silicone rubber filled therewith remains transparent, the gas mixture must be fed to the center tube of the multi-tube burner such that it may have a linear velocity at the outlet of the center tube of 50 to 120 m/sec, calculated in the standard state upon entry to the reaction chamber.

This gas linear velocity is by far greater than the known velocities used in the prior art synthesis of particulate silica from organohalosilanes. For instance, the above-cited JP-B 56-38526 describes a linear velocity of 17.6 m/s, 0.6 m/s, 9.5 m/s and 10.5 m/s, calculated in the standard state, in Examples 1, 2, 3 and 4, respectively.

Presumably the increased gas linear velocity at the burner outlet provides an increased slope of velocity in the flow field, enhanced turbulence and a reduced vortex scale. The enhanced turbulence increases the flame propagation area and burning velocity. This promotes hydrolysis of the organohalosilane in the flame whereby silica having a narrow particle size distribution is synthesized.

For the operation of the multi-tube burner, it is preferred that a velocity slope be provided between the gas mixture ejected from the center tube and the free oxygen-containing gas (typically air) ejected from the second tube surrounding the center tube. That is, the gas linear velocity at the outlet of the second tube is preferably set at a level of 10 to 80% of the gas linear velocity at the outlet of the center tube.

It has been found that synthesis under these restricted conditions yields silica having a specific surface area of 100 to 400 m²/g and a narrow particle size distribution as demonstrated by a logarithmic standard deviation of primary particle diameter of up to 0.5. It is noted that the specific surface area is measured by the BET method.

Also, the diameter and particle size distribution of primary particles are determined using a photomicrograph under an electron microscope. It is known for powder particles that a frequency distribution curve drawn by plotting the logarithm of particle diameters becomes a substantially normal distribution. A smaller logarithmic standard deviation (σ) given by the following equation indicates more uniform particle diameters.

$$\ln X_{av} = \sum_{}^{n} \ln X / n$$

$$\sigma^2 = \sum_{}^{n} (\ln X - \ln X_{av})^2 / (n-1)$$

Logarithmic standard deviation = $\sqrt{\sigma^2} = \sigma$

Herein, X is a particle diameter and n is the number of particles.

The other requirement of the invention is that the proportion of the flammable gas (capable of generating water vapor when burned) relative to the organohalosilane be such that the molar amount of water vapor resulting from combustion of the flammable gas is 1.0 to 6.0 times and preferably 1.0 to 2.0 times the stoichiometric amount (n/2) in scheme (I).

$$R_{4-n}SiX_n + (n/2)H_2O \rightarrow R_{4-n}SiO_{n/2} + nHX \quad (I)$$

As understood from scheme (I), this means that the water vapor resulting from the flammable gas should be fed in a sufficient amount for the organohalosilane to hydrolyze. The stoichiometric scheme for the synthesis of silica from organohalosilane is described below where the organohalosilane is methyltrichlorosilane.

$$CH_3SiCl_3 + 2O_2 \rightarrow SiO_2 + CO_2 + 3HCl$$

This scheme indicates that water vapor is stoichiometrically unnecessary for the synthesis of silica from methyltrichlorosilane. In fact, merely for the purpose of silica synthesis, the flammable gas that generates a sufficient amount of water vapor as indicated by scheme (I) is unnecessary. However, to obtain particulate silica having a minimized variation of primary particle diameter, the amount of water vapor that takes in the hydrolysis of organohalosilane is necessary. The reason is presumed as follows. The enlargement of particles occurs because the water vapor resulting from combustion of hydrocarbon or the like which is the functional group on the organohalosilane is unlikely to contribute to hydrolysis of the organohalosilane on account of a slow combustion rate involved therein, and inversely stated, because water vapor necessary for hydrolysis is depleted in proximity to the burner outlet. It is thus advantageous to use hydrogen featuring a high combustion rate. The water vapor also contributes to impart active OH groups to the silica surface. Additionally, the presence of the flammable gas assists in forming a stable flame.

In a preferred embodiment, the free oxygen-containing gas fed to the mixture should contain an amount of oxygen which is 1.0 to 2.0 times the sum of the oxygen equivalent necessary to synthesize $SiO_2$ from $R_{4-n}SiO_{n/2}$, that is, $C_iH_jSiO_{n/2}$ and the oxygen equivalent necessary for combustion of the flammable gas.

The reason is presumed as follows. As is well known, the free oxygen-containing gas must be mixed in a sufficient amount to prevent the carbon originating from the organohalosilane from being left. Additionally, the free oxygen-containing gas plays the role of adjusting the flame temperature. It is known that the specific surface area of particulate silica is correlated to the flame temperature. The flame temperature is adjusted by the amount of heat released by combustion of the organohalosilane and the flammable gas and the amount of the free oxygen-containing gas, typically air, so that particulate silica having the desired specific surface area may be synthesized.

As long as the above-described essential and preferred requirements are met, any conventional procedure may be employed to carry out the flame hydrolysis of organohalosilane to produce particulate silica. The conditions employed for flame hydrolysis may be selected from known parameters.

The particulate silica produced by the inventive method finds use in any applications contemplated for such particulate silica in the prior art. In particular, it is advantageously used as a filler because silicone moldings filled therewith are highly transparent.

In the preparation of particulate silica from organohalosilane as a raw material, the invention is successful in producing particulate silica having a specific surface area of 100 to 400 $m^2/g$ and a narrow particle size distribution of primary particles and ensuring the transparency of silicone moldings filled therewith. While the disposal of by-product methyltrichlorosilane in the synthesis of dimethyldichlorosilane from metallic silicon and methyl chloride is problematic to the silicone manufacturer, the inventive method can effectively utilize the by-product to produce particulate silica having so improved characteristics that silicone moldings filled therewith are obtainable to high transparency.

EXAMPLE

Examples of the invention are given below by way of illustration and not by way of limitation. All parts are by weight.

Example 1

A quadruple-tube burner as shown in FIG. 1 was used.

A gas mixture of 45 kg/h methyltrichlorosilane, 15 $Nm^3$/h hydrogen and 124 $Nm^3$/h dry air was fed to the center tube 1 of the burner. It is noted that the methyltrichlorosilane was heated in an evaporator before it was fed as a gas. The gas mixture was injected from the outlet to the reaction chamber at a linear velocity of 82 m/s calculated in the standard state.

To the air feed tube 2, dry air was fed at a rate of 13.7 $Nm^3$/h. To the hydrogen feed tube 3, hydrogen was fed at a rate of 6.6 $Nm^3$/h. To the air feed tube 4, dry air was fed at a rate of 13.7 $Nm^3$/h. Additional dry air was fed to the reaction chamber at a rate of 99.8 $Nm^3$/h.

Figure 2:
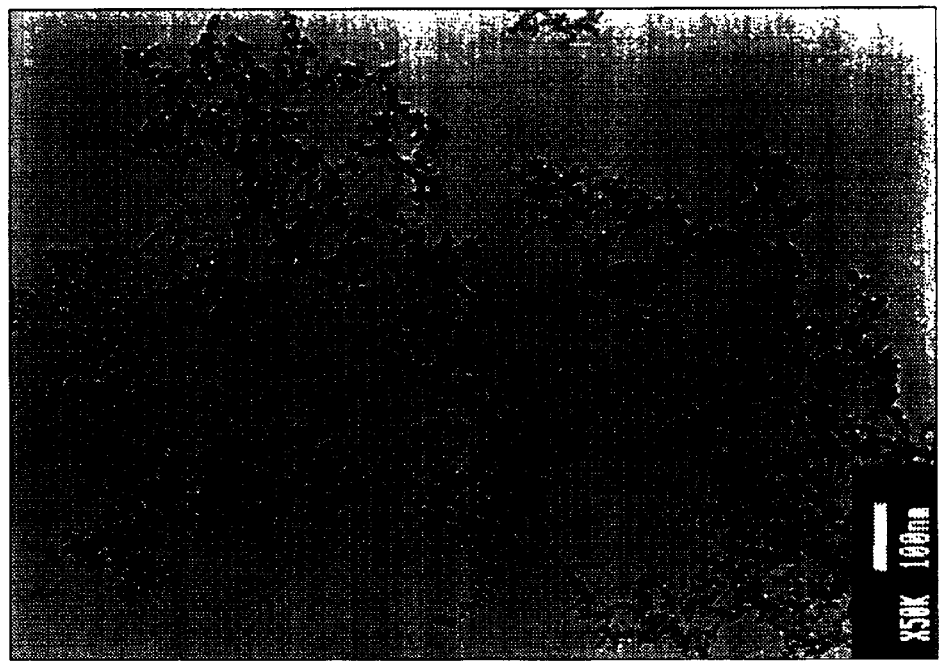
FIG. 2 is a photomicrograph×50,000 of silica particles obtained in Example 1.

Particulate silica was produced in a yield of 18 kg/h. The particulate silica had a specific surface area of 210 $m^2$/g as measured by the BET method. FIG. 2 is a photomicrograph of this particulate silica. The diameter of primary particles was measured on the photomicrograph, and a particle size distribution and a logarithmic standard deviation were calculated therefrom. The particle size distribution is reported in Table 2. The logarithmic standard deviation was 0.33.

Using the particulate silica, a silicone rubber composition was formulated according to the following recipe. There was furnished a methylvinylpolysiloxane gum consisting of 99.85 mol % $(CH_3)_2SiO$ units and 0.15 mol % $(CH_3)(CH_2=CH)SiO$ units, end blocked with $(CH_2=CH)(CH_3)_2SiO_{1/2}$ units and having a degree of polymerization of about 7,000. In a kneader, 100 parts of the methylvinylpolysiloxane gum as an organopolysiloxane component, 40 parts of the above-synthesized particulate silica as a reinforcing filler, and 8 parts of dimethylpolysiloxane having a hydroxyl group at each end of its molecular chain and a degree of polymerization of 10 as a dispersant were intimately mixed and thereafter, heat treated at 170° C. for 2 hours.

To the silicone rubber composition was added 0.5 part of 2,5-bis(t-butylperoxy)-2,5-dimethylhexane as a curing agent. Using a press platen, the silicone rubber composition was pressed cured at 170° C. for 10 minutes into a molded part in the form of a sheet of 10 mm thick.

The molded part was measured for transmittance in the visible region by an automatic spectrophotometer Model U-3400 by Hitachi Ltd.

500 nm 22%

600 nm 36%

700 nm 47%

The molded silicone part was found transparent.

Example 2

A quadruple-tube burner as shown in FIG. 1 was used.

A gas mixture of 50 kg/h methyltrichlorosilane, 11.3 Nm$^3$/h hydrogen and 125 Nm$^3$/h dry air was fed to the center tube 1 of the burner. It is noted that the methyltrichlorosilane was heated in an evaporator before it was fed as a gas. The gas mixture was injected from the outlet to the reaction chamber at a linear velocity of 50 m/s calculated in the standard state.

To the air feed tube 2, dry air was fed at a rate of 13.7 Nm$^3$/h. To the hydrogen feed tube 3, hydrogen was fed at a rate of 6.6 Nm$^3$/h. To the air feed tube 4, dry air was fed at a rate of 13.7 Nm$^3$/h. Additional dry air was fed to the reaction chamber as in Example 1.

Particulate silica was produced in a yield of 20 kg/h. The particulate silica had a specific surface area of 215 m$^2$/g as measured by the BET method. As in Example 1, a particle size distribution and a logarithmic standard deviation were determined. The particle size distribution is reported in Table 2. The logarithmic standard deviation was 0.45.

By the same procedure as in Example 1, a molded silicone rubber part was obtained in the form of a sheet of 10 mm thick. The molded part was similarly measured for transmittance.

500 nm 18%

600 nm 33%

700 nm 46%

The transparency of this silicone rubber composition was substantially equal to Example 1.

Example 3

A quadruple-tube burner as shown in FIG. 1 was used.

A gas mixture of 38 kg/h methyldichlorosilane, 11.3 Nm$^3$/h hydrogen and 140 Nm$^3$/h dry air was fed to the center tube 1 of the burner. It is noted that the methyldichlorosilane was heated in an evaporator before it was fed as a gas. The gas mixture was injected from the outlet to the reaction chamber at a linear velocity of 90 m/s calculated in the standard state.

To the air feed tube 2, dry air was fed at a rate of 13.7 Nm$^3$/h. To the hydrogen feed tube 3, hydrogen was fed at a rate of 6.6 Nm$^3$/h. To the air feed tube 4, dry air was fed at a rate of 13.7 Nm$^3$/h. Additional dry air was fed to the reaction chamber as in Example 1.

Particulate silica was produced in a yield of 20 kg/h. The particulate silica had a specific surface area of 215 m$^2$/g as measured by the BET method. As in Example 1, a particle size distribution and a logarithmic standard deviation were determined. The particle size distribution is reported in Table 2. The logarithmic standard deviation was 0.41.

By the same procedure as in Example 1, a molded silicone rubber part was obtained in the form of a sheet of 10 mm thick. The molded part was similarly measured for transmittance.

500 nm 20%

600 nm 36%

700 nm 45%

The transparency of this silicone rubber composition was substantially equal to Example 1.

Comparative Example 1

A quadruple-tube burner as shown in FIG. 1 was used.

A gas mixture of 50 kg/h methyltrichlorosilane, 15 Nm$^3$/h hydrogen and 128 Nm$^3$/h dry air was fed to the center tube 1 of the burner. It is noted that the methyltrichloro-silane was heated in an evaporator before it was fed as a gas. The gas mixture was injected from the outlet to the reaction chamber at a linear velocity of 21 m/s calculated in the standard state.

To the air feed tube 2, dry air was fed at a rate of 13.7 Nm$^3$/h. To the hydrogen feed tube 3, hydrogen was fed at a rate of 6.6 Nm$^3$/h. To the air feed tube 4, dry air was fed at a rate of 13.7 Nm$^3$/h. Additional dry air was fed around the burner at a rate of 95.8 Nm$^3$/h.

Figure 3:
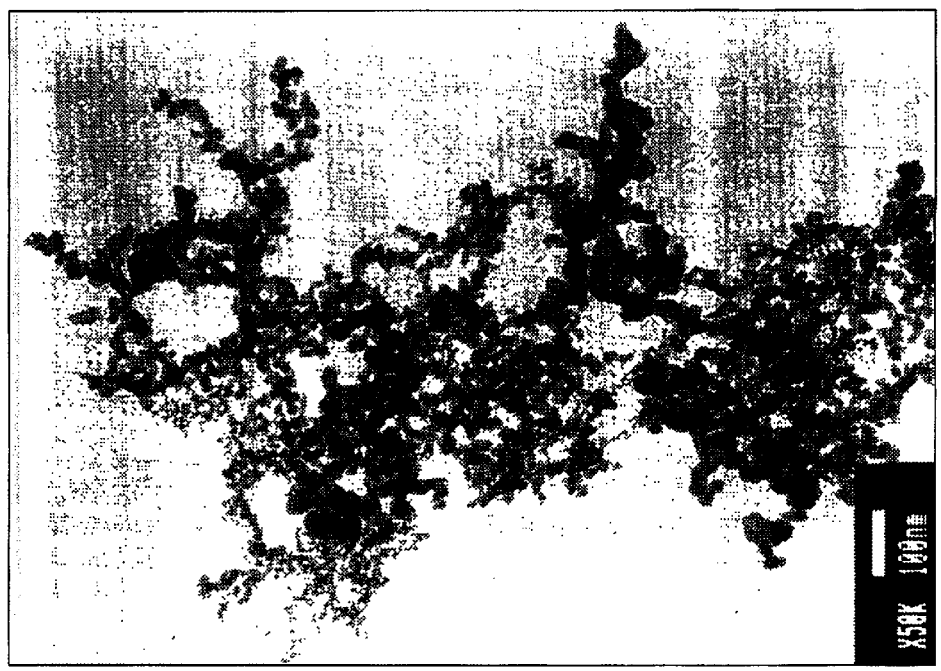
FIG. 3 is a photomicrograph×50,000 of silica particles obtained in Comparative Example 1.

Particulate silica was produced in a yield of 20 kg/h. The particulate silica had a specific surface area of 215 m$^2$/g as measured by the BET method. FIG. 3 is a photomicrograph of this particulate silica. As in Example 1, a particle size distribution and a logarithmic standard deviation were determined. The particle size distribution is reported in Table 2. The logarithmic standard deviation was 0.60. It is seen that coarse particles were present at a higher proportion than in the photo of FIG. 2.

By the same procedure as in Example 1, a molded silicone rubber part was obtained in the form of a sheet of 10 mm thick. The molded part was similarly measured for transmittance.

500 nm 6%

600 nm 15%

700 nm 26%

The transparency of this silicone rubber composition was inferior to Example 1.

Comparative Example 2

A quadruple-tube burner as shown in FIG. 1 was used.

A gas mixture of 50 kg/h methyltrichlorosilane, 7.5 Nm$^3$/h hydrogen and 97.8 Nm$^3$/h dry air was fed to the center tube 1 of the burner. It is noted that the methyltrichloro-silane was heated in an evaporator before it was fed as a gas. The gas mixture was injected from the outlet to the reaction chamber at a linear velocity of 64 m/s calculated in the standard state.

To the air feed tube 2, dry air was fed at a rate of 13.7 Nm$^3$/h. To the hydrogen feed tube 3, hydrogen was fed at a rate of 6.6 Nm$^3$/h. To the air feed tube 4, dry air was fed at a rate of 13.7 Nm$^3$/h. Additional dry air was fed around the burner at a rate of 164.8 Nm$^3$/h.

Figure 4:
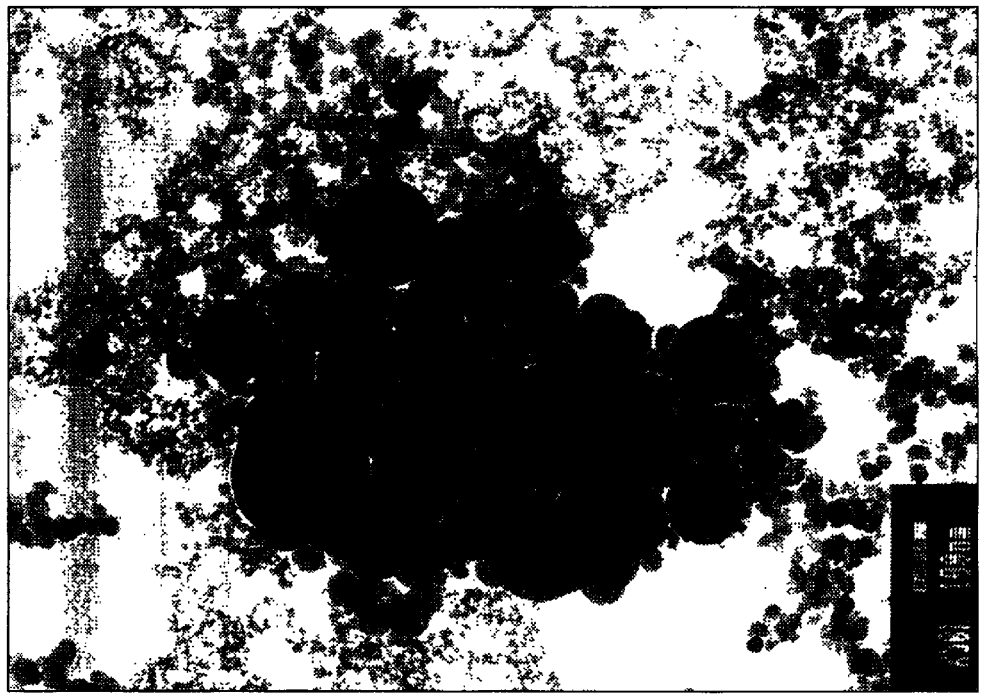
FIG. 4 is a photomicrograph×50,000 of silica particles obtained in Comparative Example 2.

Particulate silica was produced in a yield of 20 kg/h. The particulate silica had a specific surface area of 220 m$^2$/g as measured by the BET method. FIG. 4 is a photomicrograph of this particulate silica. As in Example 1, a particle size distribution and a logarithmic standard deviation were determined. The particle size distribution is reported in Table 2. The logarithmic standard deviation was 0.77. It is seen that the proportion of coarse particles is higher than in the photo of FIG. 2 and giant particles are present.

By the same procedure as in Example 1, a molded silicone rubber part was obtained in the form of a sheet of 10 mm thick. The molded part was similarly measured for transmittance.

500 nm 1%

600 nm 3%

700 nm 10%

The transparency of this silicone rubber composition was apparently inferior to Example 1.

Example 4

A quadruple-tube burner as shown in FIG. 1 was used. A gas mixture of 50 kg/h methyltrichlorosilane, 15 Nm$^3$/h hydrogen and 132 Nm³/h dry air was fed to the center tube 1 of the burner. It is noted that the methyltrichlorosilane was heated in an evaporator before it was fed as a gas. The gas mixture was injected from the outlet to the reaction chamber at a linear velocity of 87 m/s calculated in the standard state.

To the air feed tube 2, dry air was fed at a rate of 13.7 Nm³/h. To the hydrogen feed tube 3, hydrogen was fed at a rate of 6.6 Nm³/h. To the air feed tube 4, dry air was fed at a rate of 13.7 Nm³/h. Additional dry air was fed around the burner at a rate of 91.8 Nm³/h.

Particulate silica was produced in a yield of 20 kg/h. The particulate silica had a specific surface area of 305 m²/g as measured by the BET method. As in Example 1, a particle size distribution and a logarithmic standard deviation were determined. The particle size distribution is reported in Table 2. The logarithmic standard deviation was 0.45.

By the same procedure as in Example 1, a molded silicone rubber part was obtained in the form of a sheet of 10 mm thick. The molded part was similarly measured for transmittance.

500 nm 42%
600 nm 52%
700 nm 58%

Example 5

To examine the influence of an increased synthesis quantity, synthesis was carried out using a scale-up apparatus.

A quadruple-tube burner as shown in FIG. 1 was used.

A gas mixture of 125 kg/h methyltrichlorosilane, 37.4 Nm³/h hydrogen and 320 Nm³/h dry air was fed to the center tube 1 of the burner. It is noted that the methyltrichlorosilane was heated in an evaporator before it was fed as a gas. The gas mixture was injected from the outlet to the reaction chamber at a linear velocity of 50 m/s calculated in the standard state.

To the air feed tube 2, dry air was fed at a rate of 13.7 Nm³/h. To the hydrogen feed tube 3, hydrogen was fed at a rate of 9.4 Nm³/h. To the air feed tube 4, dry air was fed at a rate of 13.7 Nm³/h. Additional dry air was fed to the reaction chamber.

Particulate silica was produced in a yield of 50 kg/h. The particulate silica had a specific surface area of 205 m²/g as measured by the BET method. As in Example 1, a particle size distribution and a logarithmic standard deviation were determined. The particle size distribution is reported in Table 2. The logarithmic standard deviation was 0.30.

By the same procedure as in Example 1, a molded silicone rubber part was obtained in the form of a sheet of 10 mm thick. The molded part was similarly measured for transmittance.

500 nm 22%
600 nm 37%
700 nm 48%

The transparency of this silicone rubber composition was substantially equal to Example 1, indicating that the properties of synthesized particulate silica were not affected even when the apparatus scale was increased.

The parameters and results of Examples and Comparative Examples are summarized in Table 1.

TABLE 1

|  | Raw material | Multiple of water vapor $[(n/2) \times$ multiple] | Gas outlet linear velocity (m/s) | Specific surface area (m²/g) | Transmittance (%) | | | Number average particle diameter (nm) | Logarithmic standard deviation |
| --- | --- | --- | --- | --- | --- | --- | --- | --- | --- |
|  |  |  |  |  | @500 nm | @600 nm | @700 nm |  |  |
| Example 1 | methyltrichlorosilane | 1.49 | 82 | 210 | 22 | 36 | 47 | 13.3 | 0.33 |
| Example 2 | methyltrichlorosilane | 1.00 | 50 | 215 | 18 | 33 | 46 | 11.9 | 0.45 |
| Example 3 | methyldichlorosilane | 1.51 | 90 | 215 | 20 | 36 | 45 | 11.4 | 0.41 |
| Comparative Example 1 | methyltrichlorosilane | 1.33 | 21 | 215 | 6 | 15 | 26 | 12.6 | 0.60 |
| Comparative Example 2 | methyltrichlorosilane | 0.67 | 64 | 220 | 1 | 3 | 10 | 11.7 | 0.77 |
| Example 4 | methyltrichlorosilane | 1.33 | 87 | 305 | 42 | 52 | 58 | 7.6 | 0.45 |
| Example 5 | methyltrichlorosilane | 1.33 | 50 | 205 | 22 | 37 | 48 | 12.4 | 0.30 |

TABLE 2

Particle size distribution (unit: %)

| Particle diameter (nm) | Example 1 | Example 2 | Example 3 | Comparative Example 1 | Comparative Example 2 | Example 4 | Example 5 |
| --- | --- | --- | --- | --- | --- | --- | --- |
| 00–05 | 0.2 | 3.3 | 2.3 | 8.7 | 3.2 | 14.6 | 0.4 |
| 05–10 | 20.4 | 35.7 | 40.8 | 29.5 | 35.6 | 76.5 | 20.5 |
| 10–15 | 48.8 | 34.6 | 36.5 | 32.8 | 30.9 | 8.2 | 62.4 |
| 15–20 | 25.7 | 23.1 | 17.9 | 18.4 | 17.3 | 0.7 | 15.0 |

TABLE 2-continued

| Particle diameter (nm) | Particle size distribution (unit: %) | | | | | | |
|---|---|---|---|---|---|---|---|
| | Example 1 | Example 2 | Example 3 | Comparative Example 1 | Comparative Example 2 | Example 4 | Example 5 |
| 20–25 | 3.8 | 2.9 | 2.2 | 5.8 | 6.6 | 0 | 1.2 |
| 25–30 | 1.0 | 0.4 | 0.2 | 2.5 | 2.4 | 0 | 0.3 |
| 30–35 | 0.2 | 0 | 0 | 1.4 | 0.9 | 0 | 0.1 |
| 35–40 | 0 | 0 | 0 | 0.5 | 0.2 | 0 | 0.1 |
| 40–45 | 0 | 0 | 0 | 0.3 | 0.2 | 0 | 0 |
| 45–50 | 0 | 0 | 0 | 0.1 | 0.1 | 0 | 0 |
| 50–55 | 0 | 0 | 0 | 0 | 0.1 | 0 | 0 |
| 55–60 | 0 | 0 | 0 | 0 | 0.4 | 0 | 0 |
| ≧60 | 0 | 0 | 0 | 0 | 2.1 | 0 | 0 |
| Remarks | | | | | giant particles ≧100 nm were found | | |

Japanese Patent Application No. 2000-369466 is incorporated herein by reference.

Although a particular embodiment of the invention has been described in detail for purposes of illustration, various modifications and variations may be made without departing from the spirit and scope of the invention. Accordingly, the invention is not to be limited except as by the claims.

What is claimed is:

1. A method for preparing particulate silica, comprising the step of feeding a gas mixture of at least one organohalosilane gas of the formula: $R_{4-n}SiX_n$ wherein R is hydrogen, methyl, ethyl or phenyl, X is a halogen atom, n is an integer of 1 to 3, with the proviso that n=3 when R is phenyl, a flammable gas capable of generating water vapor when burned, and a free oxygen-containing gas to a reaction chamber through a burner, whereby the organohalosilane is subjected to flame hydrolysis according to the scheme (I):

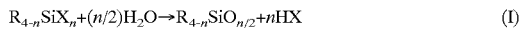
$$R_{4-n}SiX_n + (n/2)H_2O \rightarrow R_{4-n}SiO_{n/2} + nHX \qquad (I)$$

wherein R, X and n are as defined above, and then to oxidation reaction according to the scheme (II):

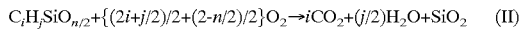
$$C_iH_jSiO_{n/2} + \{(2i+j/2)/2 + (2-n/2)/2\}O_2 \rightarrow iCO_2 + (j/2)H_2O + SiO_2 \qquad (II)$$

wherein $C_iH_j$ is a general form of $R_{4-n}$ so that i varies in the range of 0 to 6 and j varies in the range of 1 to 15 as R is hydrogen, methyl, ethyl or phenyl, n is as defined above, with the proviso that n=3 when R is phenyl, thereby forming particulate silica, having a specific surface area of 205 to 400 $m^2/g$ and a logarithmic standard deviation of primary particle diameter of up to 0.5 wherein the amount of said flammable gas fed is ½ to 3 mol per mol of said organohalosilane and such that the amount of water vapor resulting from combustion of said flammable gas is 1 to 2 times the stoichiometric amount in scheme (I), said burner has a plurality of concentric tubes including a center tube, having an outlet open to the reaction chamber, said gas mixture is fed to the center tube of said burner such that it may have a linear velocity at the outlet of the center tube of 50 to 120 m/sec, calculated in the standard state, and said flammable gas or said free oxygen-containing gas is fed to each outer tube arranged concentrically around the center tube of the burner.

2. The method of claim 1 wherein the amount calculated as oxygen of said free oxygen-containing gas fed is 1.0 to 2.0 times the sum of the oxygen equivalent necessary to synthesize $SiO_2$ from $C_iH_jSiO_{n/2}$ in scheme (II) and the oxygen equivalent necessary for theoretical combustion of said flammable gas.

3. The method of claim 1 wherein said organohalosilane is methyltrichlorosilane which is a by-product in the synthesis of dimethyldichlorosilane from metallic silicon and methyl chloride.

4. The method of claim 1 wherein said flammable gas is hydrogen.

5. The method of claim 1 wherein said free oxygen-containing gas is air.

6. The method of claim 1 wherein said burner is a quadruple-tube burner having center, second, third and fourth tubes arranged concentrically from inside to outside, a mixture of the organohalosilane gas, the flammable gas and the free oxygen-containing gas is fed to the center tube, the free oxygen-containing gas is fed to the second tube, the flammable gas is fed to the third tube, and the free oxygen-containing gas is fed to the fourth tube.

7. The method of claim 1 wherein said burner is a triple-tube burner having center, second and third tubes arranged concentrically from inside to outside, a mixture of the organohalosilane gas, the flammable gas and the free oxygen-containing gas is fed to the center tube, the free oxygen-containing gas is fed to the second tube, and the flammable gas is fed to the third tube.

8. The method of claim 1 wherein said burner is a double-tube burner having a center tube and a second tube surrounding the center tube, a mixture of the organohalosilane gas, the flammable gas and the free oxygen-containing gas is fed to the center tube, and the free oxygen-containing gas is fed to the second tube.

9. The method of claim 6 wherein the gas linear velocity at the outlet of the second tube is 10 to 80% of the gas linear velocity at the outlet of the center tube.

* * * * *